(12) United States Patent
Brdiczka et al.

(10) Patent No.: US 8,392,351 B2
(45) Date of Patent: Mar. 5, 2013

(54) SYSTEM AND COMPUTER-IMPLEMENTED METHOD FOR GENERATING TEMPORAL FOOTPRINTS TO IDENTIFY TASKS

(75) Inventors: Oliver Brdiczka, Mountain View, CA (US); James (Bo) M. A. Begole, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 594 days.

(21) Appl. No.: 12/430,029

(22) Filed: Apr. 24, 2009

(65) Prior Publication Data

US 2010/0274744 A1    Oct. 28, 2010

(51) Int. Cl.
  G06F 17/00   (2006.01)
  G06N 7/00   (2006.01)
  G06N 7/08   (2006.01)

(52) U.S. Cl. .......................................... 706/58
(58) Field of Classification Search .................... 706/12, 706/58
  See application file for complete search history.

(56) References Cited

U.S. PATENT DOCUMENTS

| | | | |
|---|---|---|---|
| 7,200,584 B2 * | 4/2007 | Sakurai ............................ | 706/58 |
| 7,269,824 B2 * | 9/2007 | Noy et al. ....................... | 717/127 |
| 7,937,342 B2 * | 5/2011 | George et al. .................... | 706/16 |
| 2006/0107219 A1 * | 5/2006 | Ahya et al. ...................... | 715/745 |
| 2006/0195410 A1 * | 8/2006 | Terasawa ......................... | 706/20 |
| 2007/0226248 A1 * | 9/2007 | Darr .............................. | 707/102 |

OTHER PUBLICATIONS

Magnusson, Magnus. "Discovering hidden time patterns in behavior: T-patterns and their detection." Behavior Research Methods 32.1 (2000): 93-110.*

Brdiczka, Oliver; Su, Norman Makoto; Begole, Bo. "Using temporal patterns (t-patterns) to derive stress factors of routine tasks." CHI 2009.*

M.S. Magnusson, Discovering Hidden Time Patterns in Behavior: T-Patterns and Their Detection. Behavior Research Methods, Instruments, & Computers, 32(1):93-110, 2000.

Dragunov et al., J.L. 2005, "TaskTracer: A Desktop Environment to Support Multi-Tasking Knowledge Workers," Proc. of IUI '05, 75-82, DOI=http://doi.acm.org/10.1145/1040830.1040855.

Shen et al., "Real-Time Detection of Task Switches of Desktop Users," Proc. Of IJCAI, 2007.

Oliver et al., A.C. 2006, "SWISH: Semantic Analysis of Window Titles and Switching History," Proc. of IUI '06, 194-201, DOI=http://doi.acm.org/10.1145/1111449.1111492.

http://caloproject.sri.com, CALO: Cognitive Assistant that Learns and Organizes, 2008.

http://en.wikipedia.org/wiki/Tf-idf, Wikipedia, the free encyclopedia, 2009.

* cited by examiner

*Primary Examiner* — Kakali Chaki
*Assistant Examiner* — Daniel Pellett
(74) *Attorney, Agent, or Firm* — Patrick J. S. Inouye; Krista A. Wittman

(57) ABSTRACT

A system and computer-implemented method for generating temporal footprints to identify tasks is provided. One or more events performed by a user during execution of a task is recorded. Patterns including sequences of two or more of the events are identified. Each pattern occurs at a plurality of occurrences. A determination of whether each pattern is significant is made. A temporal distance between the events in each pattern occurrence for each pattern is identified. A pattern value is determined for each pattern based on a number of occurrences and the associated temporal distance. The pattern value is applied to a significance level. At least one of the patterns is determined to be significant when the pattern value satisfies the significance level. A temporal footprint is generated for the executed task and includes the significant patterns.

22 Claims, 3 Drawing Sheets

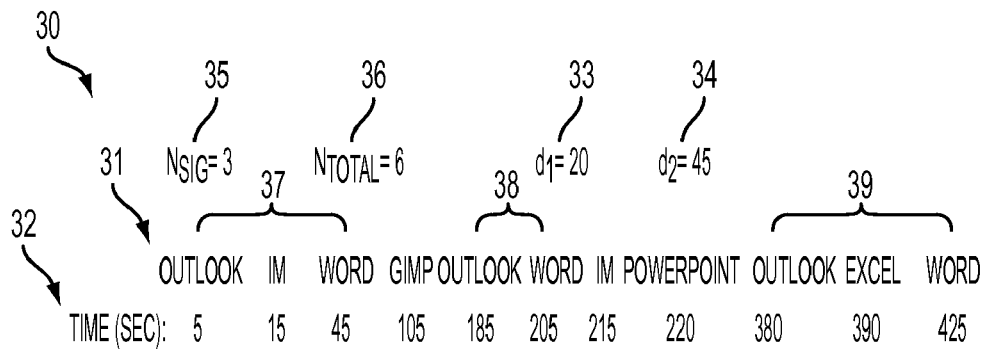
FIG. 3
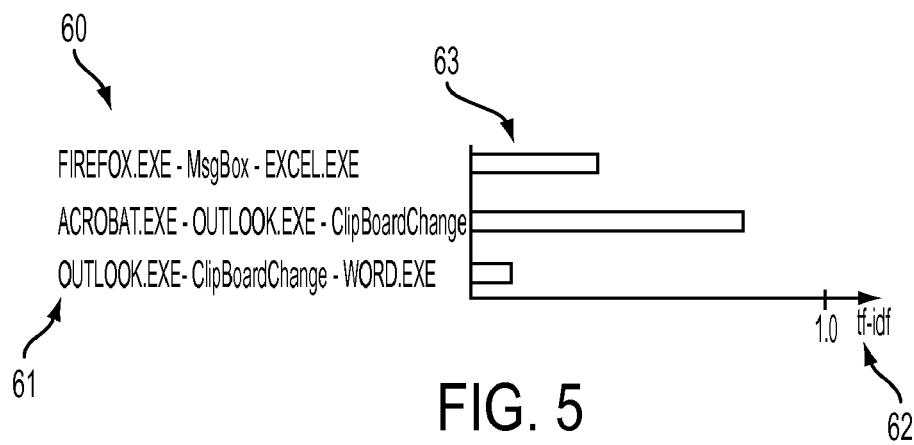
FIG. 4
FIG. 5

SYSTEM AND COMPUTER-IMPLEMENTED METHOD FOR GENERATING TEMPORAL FOOTPRINTS TO IDENTIFY TASKS

FIELD

This application relates in general to event prediction and, in particular, to a system and method for generating temporal footprints to identify tasks.

BACKGROUND

Certain classes of routines can be characterized by repetitive events occurring with a periodic frequency or temporal regularity, known as rhythm. Patterns can be identified from the events to characterize a routine task performed by an individual at home, in the workplace, or during a social event. In the workplace, patterns provide valuable information for scheduling purposes and work efficiency. For example, the regular rotation of doctors while taking their hospital rounds generally follows a pattern with predictable regularity. The pattern can include events, such as visiting patients and family members, stopping for coffee, and restroom breaks. Once nurses are aware of a pattern, the nurses can determine the best time to contact a doctor, rather than waste resources and time waiting for the doctor. Routine tasks, such as the doctor's rotation, are characterized by specific recurrent events that are executed within nearly constant time intervals. By examining past, recurring rhythms, one can predict a task based on current events.

More recently, usage of certain media, such as email, has been observed to have rhythms. Conventional task management systems provide efficient methods for task switching, resumption, and identification. However, the conventional task management systems fail to use temporal information for describing and detecting routine tasks. For example, the Task-Tracer system, which is a part of the Cognitive Assistant that Learns and Organizes project by the Defense Advanced Research Projects Agency, focuses on determining how tasks are completed. A user's interactions with respect to computer applications are tracked. The interactions are then organized according to task. The task information is used to increase efficiency and productivity in a work environment. However, temporal information, including identifying durations between interactions is not considered.

Additionally, the Semantic Analysis of Window Titles and Switching History system ("SWISH") by Microsoft Corporation, Redmond, Wash., attempts to automatically detect tasks through window switching analysis by identifying windows on a user's desktop and determining a relationship between the windows. Windows that belong to the same task are assumed to share common properties, which are indicated by the relationship. The windows switching analysis of SWISH focuses on building a connected graph of window switch sequences within a predefined time interval, rather than characterizing a task using duration information between each window switch.

Thus, a system and method for describing and detecting routine tasks using temporal measures of user events is needed.

SUMMARY

According to aspects illustrated herein, there is provided a system and computer-implemented method for generating temporal footprints to identify tasks. One or more events performed by a user during execution of a task is recorded. Patterns including sequences of two or more of the events are identified. Each pattern occurs at a plurality of occurrences. A determination of whether each pattern is significant is made. A temporal distance between the events in each pattern occurrence for each pattern is identified. A pattern value is determined for each pattern based on a number of occurrences and the associated temporal distance. The pattern value is applied to a significance level. At least one of the patterns is determined to be significant when the pattern value satisfies the significance level. A temporal footprint is generated for the executed task and includes the significant patterns.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 3 is a timeline diagram showing, by way of example, a significant recurring pattern of events, in accordance with one embodiment.

FIG. 4 is a table diagram showing, by way of example, a list of patterns extracted for a routine task, in accordance with one embodiment.

FIG. 5 is a table diagram showing, by way of example, a temporal task footprint for a routine task, in accordance with one embodiment.

DETAILED DESCRIPTION

Routine tasks can be characterized by specific recurrent events that are executed within nearly constant time intervals. Identifying temporal characteristics of the events, such as the time intervals, utilizes the temporal regularity of a routine to identify patterns of the events. A temporal footprint for a particular task can be generated from one or more of the identified patterns to classify newly tracked events as belonging that task.

Temporal footprint generation and task identification are performed by a computer system, such as a personal computer or a handheld computing device. The computer system can include a pattern identification module, a footprint module, and a task module, as well as components, such as such as a central processing unit ("CPU"), memory, input/output ports, network interfaces, and non-volatile storage. The pattern identification module can identify recurring patterns of events during an observation period in which a user performs a particular task and determine which recurring patterns are significant. The footprint detection module compiles the significant patterns for the task to generate a temporal footprint. The task identification module tracks events preformed by another user, identifies patterns within the tracked events, and compares the patterns to a database of the temporal footprints. The task associated with the temporal footprint most similarly related to the tracked events is assigned. Other types of modules and module functions are possible.

The modules can be implemented as a computer program or procedure written as source code in a conventional programming language and is presented for execution by the CPU as object or byte code, as is known in the art. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums, or embodied on a transmission medium in a carrier wave.

Detecting Temporal Patterns

Tasks performed on a computer can be identified as being associated with one or more patterns of recurrent events performed by an individual user on at least one computer application. A pattern is characterized by a sequence of two or more events that occur in a particular sequential order during a temporal interval. During an observation period, reoccurrences of the pattern can be identified. The observation period provides a duration of time during which the events are recorded, while the temporal interval defines a duration of time between the events in a pattern. The temporal interval can be used with a particular pattern to identify, describe, and detect routine tasks.

Figure 1:
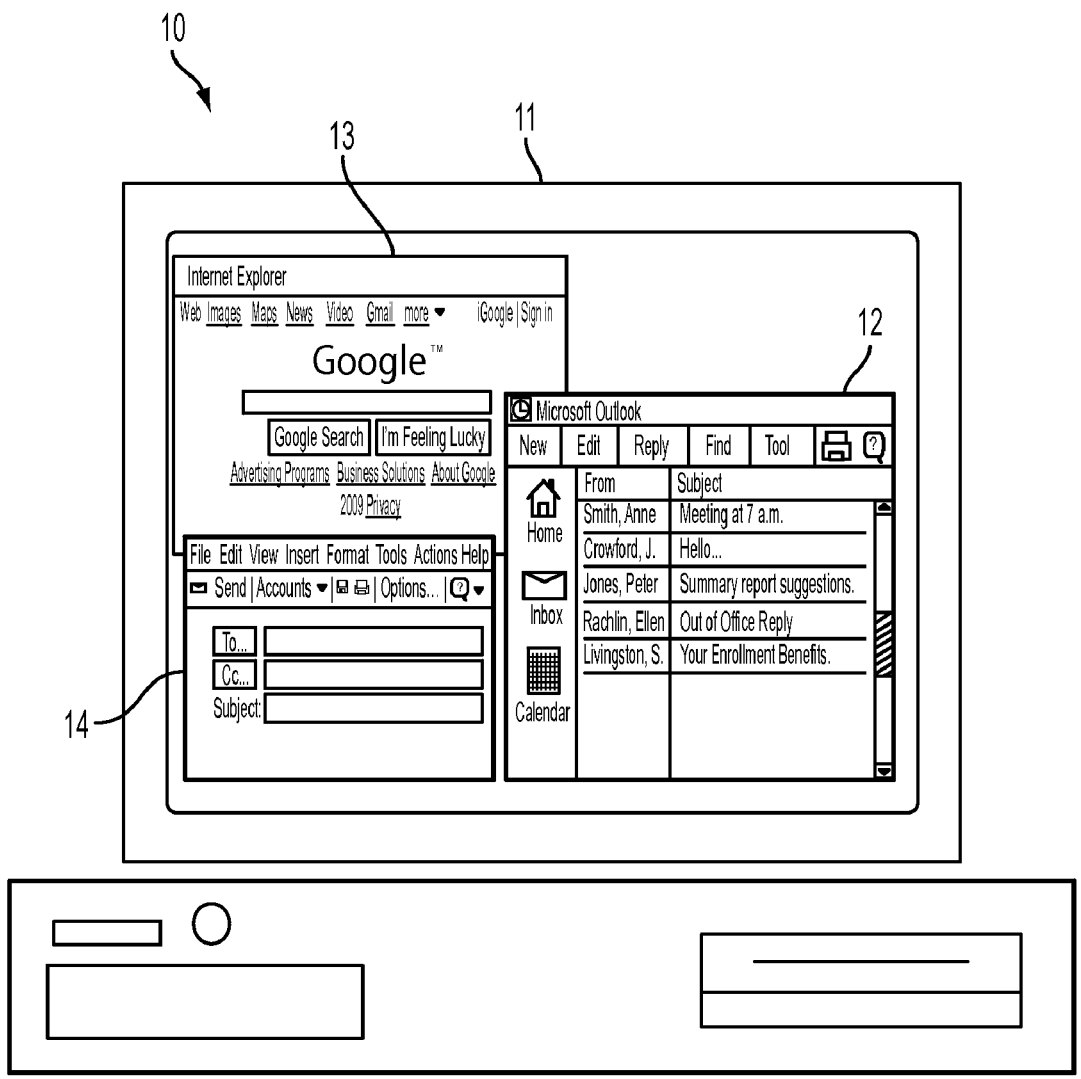
FIG. 1 is a block diagram showing, by way of example, a computer with multiple applications.

To identify temporal patterns relating to computer media, application use by one or more individuals is tracked. FIG. 1 is a block diagram showing, by way of example, a computer 10 with multiple applications 12, 13. The computer 10 can include a memory for storing the applications and a processor for executing the applications based on a request by a user. The user can access one or more of the applications 12, 13 available on the computer 10 through a user interface of an operating system. For instance, an email application 12, such as Microsoft Outlook, licensed by Microsoft Corporation, Redmond, Wash., can be accessed and displayed on a display screen 11. A Web browser application 13, such as Internet Explorer, also licensed by Microsoft Corporation, supra, can be selected and displayed. Outlook and Internet Explorer are two forms of software applications frequently available on a work computer or a personal computer. Other types of computing devices can be used, such as a mobile or handheld computing device, as well as similar programmable computing systems or devices. At a minimum, the computing device 10 should include components conventionally found in general purpose programmable computing devices, such as a central processing unit, memory, input/output ports, network interfaces, and non-volatile storage. Other components are possible.

An application 12, 13 is determined to be in use based on identified events. The events each include an action performed by an individual on or within an application. For example, the actions can occur with respect to application windows, window position, active documents, and email sender or recipient. Other types of actions are possible.

The application windows refer to a current application accessed by the individual, such as Outlook 12, and a current window that is in use within the current application, such as an email message 14 in Outlook. Generally, each application includes several windows, which can provide a higher granularity observation of the events with respect to the applications. Actions, such as opening or closing the current window are identified as an event associated with the current application. Other types of application window actions are possible. A position of the application windows can also be used to identify events. Each window position on the screen can be described by one or more factors, including a width and height of the window, as well as by x and y coordinates of the window on the display screen 11. All window positions that have been observed are clustered into n clusters using an expectation-maximization clustering algorithm. Other clustering algorithms are possible. During expectation-maximization clustering, one or more selected windows are assigned to clusters, which are each associated with an identifier. Each window is placed within a cluster having a maximum likelihood of similarity. The similarity is measured based on the factors of the window to be placed. The identifier of the cluster having the maximum likelihood of similarity for the application window is used as input for an event.

An active document refers to the document upon which, the user is currently working on within an application, such as composing an email 14 using Outlook. The selecting or opening of an active document within a particular application can be identified as an event, as well as typing or selecting an icon within the application. Other events relating to active documents are possible. Email sender and recipient events can be identified each time the user selects, writes, or receives an email. The identified email event is generated for both the sender and recipient of the email. These events contain the current time and the identifiers of the sender and recipient. Other types of actions and events are possible. For example, the events can be identified at the application level, as described above, or by any actions recorded through a user interface on the computer. Once identified, the events can be used for pattern analysis and detection.

The events are tracked and recorded over an observation period, which is a finite time period. The events can be identified based on a set of predetermined actions or alternatively, based on any action performed by an individual through the user interface. After each event has been identified within the observation period, an occurrence time of the event and an application associated with the event is recorded. Subsequently, the tracked events and associated occurrence times can be analyzed to detect patterns of recurring events.

During detection analysis, a pattern detection algorithm is applied to the events recorded during the observation period to identify a pattern. In one embodiment, a T-pattern detection method is used, such as disclosed in M. S. Magnusson, "Discovering Hidden Time Patterns in Behavior: T-Patterns and Their Detection," Behavior Research Methods, Instruments, and Computers, 32(1), 93-110, 2000, the disclosure of which is incorporated herein by reference in its entirety. T-patterns are recurrent sequences of events that occur within a similar temporal distance. Other types of pattern detection are possible. At a minimum the pattern detection algorithm should be able to identify one or more patterns, as well as a temporal distance within which the pattern should occur.

Figure 2:
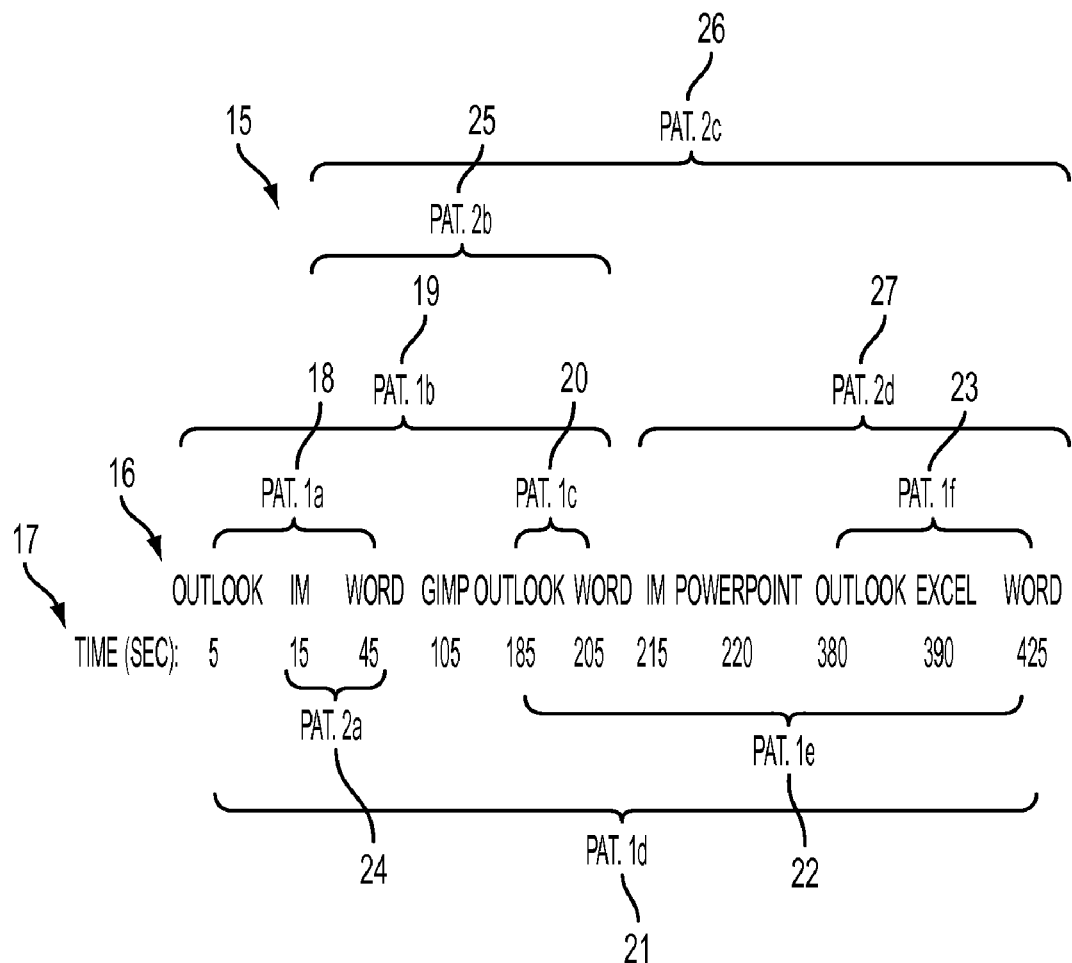
FIG. 2 is a timeline diagram showing, by way of example, tracked events, in accordance with one embodiment.

The identified patterns can be displayed on a timeline. FIG. 2 is a timeline graph 15 showing, by way of example, recurring patterns 18-27. On the timeline 15, events 16 are identified by a title of an application upon which an action was performed to generate that event. Other titles and methods for assigning titles are possible. The events 16 can be tracked for one or more individuals performing at least one task during an observation period and can include actions performed on or within computer applications, such as Microsoft Outlook, Word, PowerPoint, and Excel, licensed by Microsoft Corporation, Redmond, Wash., as well as Gimp and Instant Messaging. The events 16 are sequentially ordered on the timeline 15 based on an occurrence time 17 measured for each identified event 16.

The occurrence time 17 for each event 16 indicates a beginning of that event after which one or more actions are performed with respect to the associated application. The occurrence times can be an absolute time, such as time of day, or a time measured from the beginning of the finite temporal time period. Once recorded, sequences of two or more events 16 are identified by recursively combining successively longer durations of time measured during the observation period. Each sequence of events can be classified as a pattern. Within the observation period, multiple occurrences of the pattern can be identified. The events in the recurring patterns are located in the same sequential order within near constant pattern intervals. The pattern intervals provide a duration between the event occurrences in a pattern, which is measured using the occurrence times 17 of the events.

For example, on the timeline, a first pattern (Pattern 1) 18-23 of two events 16, Outlook and Word, can be identified as occurring six times during the observation period. Additionally, a second pattern (Pattern 2) 24-27 of two events, Instant Messenger and Word, can be identified as occurring four times during the observation period. A first occurrence (Pattern 1*a*) 18 of the first pattern includes Outlook at five seconds and Word at 45.0 seconds. A second occurrence (Pattern 1*b*)19 of the first pattern includes Outlook at five seconds and Word at 205.0 seconds. A third occurrence (Pattern 1*c*) 20 of the first pattern includes Outlook at 185.0 seconds and Word at 205.0 seconds. A fourth occurrence (Pattern 1*d*) 21 of the first pattern includes Outlook at five seconds and Word at 425.0 seconds. A fifth occurrence (Pattern 1*e*) 22 of the first pattern includes Outlook at 185.0 seconds and Word at 425.0 seconds, and a sixth occurrence (Pattern 1*f*) 23 of the first pattern includes Outlook at 380.0 seconds and Word at 425.0 seconds. Also, a first occurrence (Pattern 2*a*) 24 of the second pattern includes Instant Messenger at 15.0 seconds and Word at 45.0 seconds. A second occurrence (Pattern 2*b*) 25 of the second pattern includes Instant Messenger at 15.0 seconds and Word at 205.0 seconds. A third occurrence (Pattern 2*c*) 26 of the second pattern includes Instant Messenger at 15.0 seconds and Word at 425.0 seconds. Finally, a fourth occurrence (Pattern 2*d*) 27 of the second pattern includes Instant Messenger at 215.0 seconds and Word at 425.0 seconds. Other recurring patterns of events 16 can be determined during the observation period to identify different patterns potentially characteristic of a particular task. In the example, the recurring patterns each include two events; however, patterns can also include more than two events. In a further embodiment, a size threshold can be applied to the number of events identified in each pattern.

The sequential ordering of the events in the recurring pattern can occur as a string sequence or as a causal relationship. In a string sequence, the events are strongly sequential and occur in direct sequence without any intervening events. A causal relationship recognizes sequential ordering of the events despite any intervening events that may occur between the sequential events. Other types of sequential ordering of the events are possible. In the above example, the first (18), second (19), fourth (21), fifth (22), and sixth (23) occurrences of Pattern 1 include intervening events between Outlook and Word, whereas the third occurrence (20) of Pattern 1 has no intervening events.

A temporal interval is determined for the events in each pattern occurrence based on the occurrence times 17. In Pattern 1, the temporal interval of the first occurrence 18 is 40.0 seconds, the second occurrence 19 is 200.0 seconds, the third occurrence 20 is 20.0 seconds, the fourth 21 occurrence is 420.0 seconds, the fifth occurrence 22 is 240.0 seconds, and the sixth occurrence 23 is 45.0 seconds. During each temporal interval, the individual is assumed to have used a current application until another action is performed with respect to a different application, which is identified as a separate event.

For example, during the observation period, an action is performed on or within Outlook at five seconds. Use of Outlook is considered to occur until a subsequent event occurs on or within Instant Messenger at 15.0 seconds. Subsequent actions relating to the current application may not be recorded as an event since the current application is already recorded as being in use. Alternatively, each event can be recorded regardless of the current application recorded.

Additionally, during event tracking, if the individual performs an action external to the computer, such as answering a telephone call or leaving the computer, the current event for a current application will run for a predetermined length of time. After the predetermined time has been reached and no further actions have been performed upon the current application or upon another application, the current event will be considered to end. The end of the event is recorded as an application switch to signify that the current application is no longer in use.

Once identified, the recurring patterns and associated temporal intervals can be analyzed to determine which recurring pattern is significant. The T-pattern detection algorithm uses a statistical test to reveal whether the temporal intervals between all occurrences of two or more events in a pattern are random. Returning to the previous example, if Pattern 1 is significant, Word will tend to occur after Outlook, within a nearly constant time interval, known as the critical interval, more often than would be expected by chance. FIG. 3 is a timeline diagram 30 showing, by way of example, a significant recurring pattern 37-39 of events 31. Identified events 31 are positioned along the timeline 30 in order of occurrence time 32. The recurring pattern of events 37-39 is identified using a pattern detection algorithm, such as the T-pattern detection algorithm. Each pattern occurrence includes two or more events, such as Outlook and Word. Within the pattern occurrences, the same events occur in the same sequential order within a nearly constant time interval and can represent a particular task if the pattern occurrences are not from chance alone.

For each recurring pattern identified during the observation period, a number of occurrences of the observed pattern and associated temporal intervals are extracted and entered into the pattern detection algorithm to define a critical interval, which is then used to determine a p-value for the pattern. The resulting p-value is compared to a predetermined significance level to determine whether the recurring pattern is significant. If the p-value is below the significance level, the pattern is considered to form a significant pattern representative of a particular task. In a significant pattern, the event occurrences are determined to be not from chance alone. A significant pattern can include statistically related events that repeatedly appear in the same, relatively invariant, sequence and temporal distance. Each recurring pattern is analyzed to identify whether that pattern is significant.

Minimal 33 and maximal 34 temporal lengths are defined for the critical interval based on the p-value, which is determined during pattern detection. The minimal temporal length 33 defines a minimum temporal interval between two or more events that can be considered significant. The maximal temporal length 34 defines a maximum temporal interval between two or more events that can be considered significant. The temporal interval for each pattern occurrence is compared to the minimal 33 and maximal 34 temporal lengths to determine whether that pattern occurrence is significant. For example, the minimal 33 temporal length for a first pattern of events is 20.0 seconds and the maximal 34 temporal length is 45.0 seconds. Returning to the example of FIG. 2, a first pattern (Pattern 1) of Outlook and Word has been identified to occur six times during an observation period. The temporal interval for each occurrence is compared to the minimal and maximal temporal lengths. The first occurrence of Pattern 1 has an temporal interval of 40.0 seconds, the second occurrence has an interval of 200.0 seconds, the third occurrence has an interval of 20.0 seconds, the fourth occurrence has an interval of 420.0 seconds, the fifth occurrence has an interval of 240.0 seconds, and the sixth occurrence has an interval of 45.0 seconds. Accordingly, the first 37, third 38, and sixth 39 occurrences fall within the bounds of the minimal and maximal temporal lengths and can be considered significant. Meanwhile, the second, fourth, and fifth occurrences of Pattern 1 fall outside the bounds. The number of significant occurrences 35 of sequential events is a subset of all occurrences 36 of the sequential events. The number of significant occurrences can be recorded for each significant pattern.

Generating a Temporal Footprint

Significant patterns can be used to generate a temporal footprint, which is representative of a routine task. Temporal footprints are a list of significant temporal patterns that are weighted by term frequency-inverse document frequency measure ("tf-idf") values, which are determined using the number of significant occurrences for each pattern. FIG. 4 is a table 50 showing, by way of example, a list of significant patterns 51 representative of a task. The table 50 includes fields for pattern 51, significance value 52, number of significant occurrences 53 for the significant pattern, minimal interval 54, and maximal interval 55. The pattern field 51 provides a list of significant patterns that each include two or more events. The significant patterns can each be representative of a particular task and can be used in the temporal footprint for that task. The significance value field 52 provides a significance value determined during pattern detection, as described above with reference to FIG. 3. The number of significant patterns field 53 includes significant frequencies of occurrence for each of the significant patterns of events. The minimal temporal length field 54 includes a minimum duration value measured between a first event and a last event in a pattern of events. The maximal temporal length field 55 includes a maximum interval value measured between a first event and a last event in the pattern of events.

For each significant pattern, a pattern weight can be assigned to define the relevance of that significant pattern to a particular task. The pattern weights can be determined using tf-idf, as adapted to temporal patterns, instead of terms, which identifies the importance of a component, such as a pattern to a collection of components, such as a task. The number of significant occurrences for each pattern can be used to determine the tf-idf value, according to the equation below:

$$tfidf_{p,T} = tf_{p,T} * idf_p \quad (1)$$

where $tf_{p,T}$ is determined according to the equation below:

$$tf_{p,T} = \frac{n_{p,T}}{\sum_k n_{k,T}} \quad (2)$$

where $n_{p,T}$ is a number of occurrences of a pattern p for a task T, $n_{k,T}$ is the number of occurrences of all patterns in the task T. Further, $idf_p$ is determined according to the equation below:

$$idf_p = \log \frac{|T|}{(|T_p| + 1)} \quad (3)$$

where T is the total number of tasks and $|T_p|$ is the number of tasks for which the pattern has been observed.

The tf-idf values identify patterns most characteristic of the particular task, such as those patterns that are unique and less likely to occur in other tasks. The most commonly occurring patterns are scaled down, while patterns, which infrequently occur are scaled up. For example, the patterns with low frequencies of occurrences have higher tf-idf values than those patterns with high frequencies of occurrences.

Each task can be associated with a temporal footprint, which includes one or more significant patterns and an associated tf-idf value. FIG. 5 is a bar diagram showing, by way of example, a temporal footprint 60. The temporal footprint 60 includes a list of patterns extracted for a routine task along one axis. The patterns can be displayed using a pattern identifier, such as a name, number, or by the events in the pattern. Other types of identifiers are possible. Tf-idf values 62 are located along an axis perpendicular to the list of patterns 61. The tf-idf value 62 associated with each pattern 61 listed is displayed as a bar 63. Other representations of the temporal footprint 60 are possible, including a table, pie chart, or graph. Within the temporal footprint representation 60, the patterns can be ranked based on the associated tf-idf values 62. For example, the higher the tf-idf value 62, the more unique and distinct the pattern is to the task. The temporal footprint 60 can be stored in a database of temporal footprints, which is accessible by individuals for identifying tasks based on a new set of tracked events.

Identifying a Task

Actions of an individual can be tracked as events and recorded to identify a task performed during an observation period. Patterns of two or more events are recognized from the tracked events. Each of the recognized patterns is compared to temporal footprints each representative of a particular task. The temporal footprints have been previously learned for the associated tasks and can be stored in a database. More specifically, the newly identified pattern is compared to the patterns in each temporal footprint. Footprint scores are calculated for the newly recognized pattern using tf-idf values associated with the patterns in the temporal footprints according to the equation below:

$$\arg\max_i [tfidf\_score (\text{Candidate Task}, T_i)]$$

where $T_i$ refers to one of the stored temporal footprints. The tfidf_score of the newly recognized pattern for a temporal footprint $T_i$ is derived by adding the $tfidf_{p,T_i}$ values for all patterns p that are shared by the temporal footprint $T_i$ and the newly recognized pattern. For example, if two patterns in one of the temporal footprints matches the new pattern, the tf-idf values associated with those two patterns are assigned. The assigned tf-idf values are then totaled for each temporal footprint, as the footprint score. The temporal footprint with the highest score is selected and the routine task associated with the selected temporal footprint is representative of the tracked events.

In a further embodiment, task recognition using the temporal footprints can be provided to an individual on a computer desktop as a context bar. However, other displays of the task recognition application are possible. Once selected, the task recognition can provide task labels, task representations, and task identification, which can be displayed to the individual.

In yet a further embodiment, stress levels can be determined based on the routine-patterns detected for an individual. The stress levels can be related to word load, repetitiveness of events, and deviation from a routine pattern, which can be recognized from stress factors derived from the detected patterns. The stress factors can include length of pattern, number of occurrences, type of pattern, and temporal measures of the events. Other stress factors and determinations of stress using the stress factors are possible.

While the invention has been particularly shown and described as referenced to the embodiments thereof, those skilled in the art will understand that the foregoing and other changes in form and detail may be made therein without departing from the spirit and scope.

What is claimed is:

1. A system for generating temporal footprints to identify tasks, comprising:
    a determination module to identify one or more computer applications in use by a user;
    an event identification module to record one or more events each comprising an action performed by the user on or within one of the computer applications;
    a pattern determination module to identify patterns each comprising a sequence of two or more of the events, wherein each pattern occurs at a plurality of pattern occurrences;
    a pattern significance module to identify one or more of the patterns that are significant as representative of a task performed by the user, comprising:
        a distance module to determine a temporal distance between the events in each pattern occurrence for each pattern;
        a pattern value module to determine a pattern value for each pattern based on a number of the pattern occurrences and the associated temporal distances for the pattern occurrences; and
        a significance determination module to apply the pattern value to a significance level and determining that the one or more patterns are significant when the pattern value satisfies the significance level;
    a footprint module to assign a pattern weight to each significant pattern representative of the task, to generate a temporal footprint for the task comprising the significant patterns, which are each representative of the task and wherein the significant patterns with the higher weights are more distinct to the task; and
    a processor to execute the modules.

2. A system according to claim 1, wherein the events are identified over a finite temporal time period comprising discrete time intervals.

3. A system according to claim 1, further comprising:
    a pattern ranking module to rank the significant patterns by the pattern weight.

4. A system according to claim 3, wherein the pattern weight is determined using a term frequency-inverse document frequency measure based on the number of pattern occurrences for each significant pattern in the temporal footprint.

5. A system according to claim 1, wherein each significant pattern is associated with at least one of a significance value, a number of significant pattern occurrences in the significant pattern, a minimal temporal interval value, and a maximal temporal interval value.

6. A system according to claim 1, further comprising:
    a database to maintain temporal footprints, wherein each temporal footprint is representative of a different task and to store the temporal footprint generated for the task.

7. A system according to claim 6, further comprising:
    an event tracking module to track events performed by another user;
    a footprint comparison module to compare the tracked events to each temporal footprint in the database and determining a score for the tracked events with respect to each temporal footprint; and
    an assignment module to assign the task associated with the temporal footprint having the highest score to the tracked event.

8. A system according to claim 1, further comprising:
    a threshold module to determine a minimal temporal length comprising a minimal temporal distance between the two or more events in each pattern occurrence and a maximal temporal length comprising a maximal temporal distance between the two or more events in each pattern occurrence;
    a threshold comparison module to compare the temporal distance of each pattern occurrence to the minimal and the maximal temporal lengths; and
    an occurrence determination module to determine for each of the significant patterns that one or more of the pattern occurrences are significant when the associated temporal distance falls within the minimal and the maximal temporal lengths.

9. A system according to claim 1, wherein the pattern determination module recursively combines successively longer durations of time comprising the recorded events and identifies further patterns in the successively longer durations of time.

10. A system according to claim 1, wherein the applications are run on at least one of a personal computer and handheld computing device.

11. A system according to claim 10, wherein the actions comprise at least one of opening one of the applications, opening a window in the one or more applications, and working on a document in one or more of the applications.

12. A computer-implemented method for generating temporal footprints to identify tasks, comprising:
    identifying one or more computer applications in use by a user;
    recording one or more events each comprising an action performed by the user one or within one of the computer applications;
    identifying patterns each comprising a sequence of two or more of the events, wherein each pattern occurs at a plurality of pattern occurrences;
    identifying one or more of the patterns that are significant as representative of a task performed by the user, comprising:
        determining a temporal distance between the events in each pattern occurrence for each pattern;
        determining a pattern value for each pattern based on a number of the pattern occurrences and the associated temporal distances for the pattern occurrences; and
        applying the pattern value to a significance level and determining that the one or more patterns are significant when the pattern value satisfies the significance level;
    assigning a pattern weight to each significant pattern representative of the task;
    generating a temporal footprint for the task comprising the significant patterns, which are each representative of the task and wherein the significant patterns with the higher weights are more distinct to the task.

13. A computer-implemented method according to claim 12, further comprising:
    identifying the events over a finite temporal time period comprising discrete time intervals.

14. A computer-implemented method according to claim 12, further comprising:
ranking the significant patterns by the pattern weight.

15. A computer-implemented method according to claim 14, wherein the pattern weight is determined using a term frequency-inverse document frequency measure based on the number of pattern occurrences for each significant pattern in the temporal footprint.

16. A computer-implemented method according to claim 12, further comprising:
associating each significant pattern with at least one of a significance value, a number of significant pattern occurrences in the significant pattern, a minimal temporal interval value, and a maximal temporal interval value.

17. A computer-implemented method according to claim 12, further comprising:
maintaining a database of temporal footprints, wherein each temporal footprint is representative of a different task; and
storing the temporal footprint generated for the task into the database.

18. A computer-implemented method according to claim 17, further comprising:
tracking events performed by another user;
comparing the tracked events to each temporal footprint in the database and determining a score for the tracked events with respect to each temporal footprint; and
assigning the task associated with the temporal footprint having the highest score to the tracked event.

19. A computer-implemented method according to claim 12, further comprising:
determining a minimal temporal length comprising a minimal temporal distance between the two or more events in each pattern occurrence and a maximal temporal length comprising a maximal temporal distance between the two or more events in each pattern occurrence;
comparing the temporal distance of each pattern occurrence to the minimal and the maximal temporal lengths; and
determining for each of the significant patterns that one or more of the pattern occurrences are significant when the associated temporal distance falls within the minimal and the maximal temporal lengths.

20. A computer-implemented method according to claim 12, further comprising:
recursively combining successively longer durations of time comprising the recorded events; and
identifying further patterns in the successively longer durations of time.

21. A computer-implemented method according to claim 12, wherein the applications are run on at least one of a personal computer and handheld computing device.

22. A computer-implemented method according to claim 21, wherein the actions comprise at least one of opening one of the applications, opening a window in the one or more applications, and working on a document in one or more of the applications.

* * * * *